United States Patent Office 3,334,142
Patented Aug. 1, 1967

3,334,142
PROCESS FOR THE PRODUCTION OF
4-HALO-BETA IONONE
Ralph Lawrence Rowland and Herbert John Bluhm,
Winston-Salem, N.C., assignors to R. J. Reynolds Tobacco Company, Winston-Salem, N.C., a corporation of New Jersey
No Drawing. Filed Aug. 24, 1964, Ser. No. 391,795
3 Claims. (Cl. 260—587)

This invention relates to a new method for synthesizing dehydroionone.

As disclosed in the copending application, Serial No. 283,970 now Patent No. 3,211,157, filed May 29, 1963 by Ralph L. Rowland, dehydroionone is utilized as a starting material for the preparation of 4-(2-butenylidene)-3,5,5-trimethyl-2-cyclohexen-1-one, which compound is useful with tobacco for enhancing the flavor and aroma thereof.

It is a principal object of the present invention to provide a new synthesis method for dehydroionone.

A further object of the present invention is to provide a new synthesis method for dehydroionone, which method affords high yield of the desired product having a high purity and is carried out utilizing readily available reactants and in such manner that the various reaction steps are readily controlled.

In accordance with one preferred embodiment of the present invention, beta-ionone is converted to ionone enol acetate by methods known to the art. One such conversion procedure is described in British Patent 870,699. The ionone enol acetate is then reacted with a halogen to form 4-halo-β-ionone, which by dehydrohalogenation yields the desired dehydroionone.

The reactions involved in this new synthesis can be illustrated as follows:

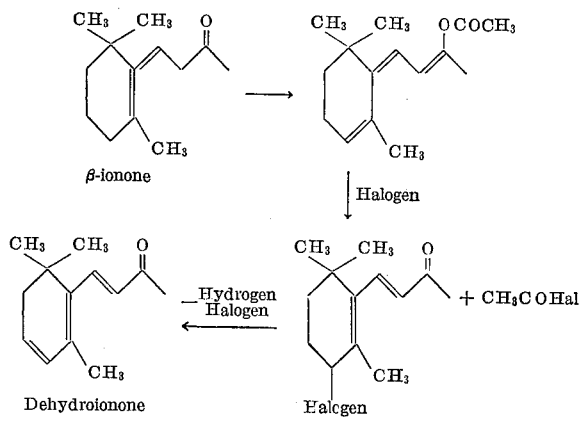

Detailed descriptions of the synthesis of the present invention is as follows, starting with ionone enol acetate obtained by a known method.

(A) *Bromination*

To a solution of 57.6 grams (0.24 mol) of ionone enol acetate in 200 milliliters of carbon tetrachloride, cooled to approximately −10 to −15° C., was added dropwise with stirring over a 3-hour period 39.2 grams (0.24 mol) of bromine in 100 milliliters of carbon tetrachloride.

Upon completion of the bromine addition to the ionone enol acetate, most of the carbon tetrachloride and acetyl bromide was removed by warming the product mixture to approximately 35° C. under reduced pressure. To the residual oil was added 100 milliliters of dimethylaniline and the resulting mixture was heated to 90–95° C. for 1 hour. To the cooled mixture was added 200 milliliters of pentane and 100 milliliters of water. The pentane solution was separated from the water and washed three times with 80-milliliter portions of 5 N hydrochloric acid. This was followed by washing four times with water. Removal of the pentane after drying the solution over anhydrous sodium sulfate yielded 63 grams of oil showing infrared absorption of dehydroionone containing carbon tetrachloride. Subsequent chromatography of this material on 452 grams of alumina afforded 30 grams of dehydroionone.

It will be noted from the above procedure that acetyl bromide was removed prior to treatment with dimethylaniline. When dehydrohalogenation is attempted with dimethylaniline prior to removal of the acetyl bromide, it is found that acetylation of the product also occurs, with the formation of dehydroionone enol acetate. This latter material is readily hydrolyzed with sodium bicarbonate solution to form the desired dehydroionone. However, the need for this additional step is eliminated by the removal of acetyl bromide prior to dehydrohalogenation and this is the preferred procedure.

(B) *Chlorination*

To a solution of 11.7 grams (0.05 mol) of ionone enol acetate in 75 milliliters of carbon tetrachloride, cooled to 0° C., was added dropwise with stirring over a 1-hour period 3.55 grams (0.05 mol) of chlorine in 75 milliliters of carbon tetrachloride. Upon completion of the chlorine addition to the ionone enol acetate, most of the carbon tetrachloride and acetyl chloride was removed by warming the product mixture to approximately 30° C. under reduced pressure. To the residual oil was added 10 milliliters of N,N-dimethylaniline and the resulting mixture was heated to 110–120° C. for 1 hour. To the cooled mixture was added 50 milliliters of pentane and 25 milliliters of water. The pentane solution was separated from the water and washed three times with 20 milliliter portions of 5 N hydrochloric acid. The solution was then washed four times with water and dried over anhydrous sodium sulfate. Subsequent removal of the solvent gave 8 grams of oil which was shown to contain a small amount of dehydroionone by its infrared absorption.

It will be understood that other suitable dehydrohalogenating agents can be utilized in the synthesis method of the present invention such as, for example, N,N,-diethylaniline, quinoline and the like.

By means of the new synthesis method of the present invention, dehydroionone can be obtained in high yields, such as on the order of about 70% or more. Moreover, the product is of high purity and the reaction is readily controlled. Also, accomplished with such readily available agents as bromine which is relatively inexpensive as compared with the agents previously used in the prior art for the synthesis of dehydroionone.

Those modifications and equivalents which fall within the spirit of the invention and the scope of the appended claims are to be considered part of the invention.

We claim:
1. A process for preparing 4-halo-β-ionone which comprises reacting in the cold ionone enol acetate with bromine or chlorine.
2. A process for preparing 4-halo-β-ionone which comprises reacting in the cold ionone enol acetate with bromine.
3. A process for preparing 4-halo-β-ionone which comprises reacting in the cold enol acetate with chlorine.

References Cited

UNITED STATES PATENTS 2,871,267   1/1959   Petracek et al. _____ 260—587

OTHER REFERENCES

Djerassi et al.: "J. Am. Chem. Soc.," vol. 75, p. 3493 (1953).

Daglish et al.: "J. Chem. Soc.," p. 2627 (1954).

LEON ZITVER, *Primary Examiner.*

M. JACOB, *Assistant Examiner.*